United States Patent [19]

Maserjian et al.

[11] 3,906,296

[45] Sept. 16, 1975

[54] STORED CHARGE TRANSISTOR

[75] Inventors: Joseph Maserjian, La Crescenta; George W. Lewicki, Studio City, both of Calif.

[73] Assignee: The United States of America as represented by the Administrator of the National Aeronautics and Space Administration, Washington, D.C.

[22] Filed: Aug. 25, 1971

[21] Appl. No.: 174,684

Related U.S. Application Data

[63] Continuation-in-part of Ser. No. 849,057, Aug. 11, 1969, abandoned.

[52] U.S. Cl. .............. 357/7; 307/238; 340/173 CA; 357/24

[51] Int. Cl. ........................................... H01l 11/14

[58] Field of Search ........ 317/234 T, 235 B, 235 G; 307/238, 289; 340/173 CA

[56] References Cited

UNITED STATES PATENTS 3,258,663 6/1966 Weimer ............................. 317/235
3,447,043 5/1969 Wallace ............................. 317/234
3,500,142 3/1970 Kahng ................................ 317/235
3,624,428 11/1971 Weimer ............................. 317/235

FOREIGN PATENTS OR APPLICATIONS 813,537 5/1969 Canada .............................. 317/235

*Primary Examiner*—Jerry D. Craig
*Attorney, Agent, or Firm*—Monte F. Mott; Paul F. McCaul; John R. Manning

[57] ABSTRACT

A stored charge device of the general type designated as an MNOS field-effect transistor, has its operation improved by embedding a thin metal layer between two insulating films used in the transistor. The embedded metal layer technique is also used to provide a two-terminal thin-film stored charge device, consisting of a "metal-insulator-embedded metal-insulator-metal," sandwich structure which can be used in high-density memory arrays.

4 Claims, 13 Drawing Figures

INVENTORS
JOSEPH MASERJIAN
GEORGE W. LEWICKI
BY Lindenberg & Freilich
ATTORNEYS

INVENTORS
JOSEPH MASERJIAN
GEORGE W. LEWICKI
BY Lindenberg & Freilich
ATTORNEYS

PATENTED SEP 16 1975 3,906,296

SHEET 3 OF 5

INVENTORS
JOSEPH MASERJIAN
GEORGE W. LEWICKI
BY Lindenberg & Freilich
ATTORNEYS

INVENTORS
JOSEPH MASERJIAN
GEORGE W. LEWICKI
BY Lindenberg + Freilich
ATTORNEYS

INVENTORS
JOSEPH MASERJIAN
GEORGE W. LEWICKI
BY
Lindenberg Freilich & Wasserman
ATTORNEYS

STORED CHARGE TRANSISTOR

This application is a continuation-in-part of application Ser. No. 849,057, filed Aug. 11, 1969 now abandoned.

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to Metal-Nitride-Oxide-Silicon field-effect transistors, known as MNOS FETs, and more particularly to improvements in the structure for obtaining the charge storage effect therein. The invention also describes a new two-terminal thin-film memory device based on the improved structure for obtaining the charge-storage effect.

The basic operation of the MNOS type transistors depends upon the use of two different insulating films (silicon nitride and silicon oxide) formed on a silicon surface. Suitable electrodes are applied to the silicon and the sandwich comprised of the two film layers on the silicon substrate for affording electrodes which are designated as a source, a drain, and a gate.

When a sufficiently large voltage pulse is applied between the gate and the drain electrode, charge is stored which is assumed to occupy trapping states in the nitride film or, ideally, near the nitride-oxide interface. This charge may be changed by controlling the magnitude and polarity of voltage pulses applied from gate drain for various time durations, whereby electrons may be removed or added. High voltage pulses then constitute the write-in procedure for storing information, which can be easily read out upon the application of lower operating voltages. The polarity, or presence or absence of a charge, can be detected by the amplitude of a current which is present between the source and drain electrode upon the application of these normal readout voltages.

There is a limitation on the utility of a device of the type described, in view of the fact that a finite time is required to store charge in traps so that the stored charge remains over a long period. Deep traps, which are the effective ones in the sence that charge does not dissipate from them, have small capture cross sectons requiring longer duration pulses (on the order to a millisecond) in order for the occupancy of these traps to be significantly changed. Shorter pulses primarily affect shallow traps and the stored charge becomes increasingly volatile. High-speed computers with nonvolatile memories call for submicrosecond read-in and read-out time, which the described structure is not capable of providing.

OBJECTS AND SUMMARY OF THE INVENTION

An object of the present invention is the provision of a structure of the type described which is capable of non-volatile data storage ans short write-in and readout times suitable for use with high-speed computers.

Another object of the present invention is the provision of a novel thin-film metal-insulator-semiconductor structure suitable for charge storage.

Still another object of the present invention is the provision of a thin-film metal-insulator-metal storage device capable of simple assembly into a high-density memory array.

The objects of the invention are achieved in part by the provision of a semiconductor substrate which in one embodiment may be made of single-crystal silicon upon which there is grown a silicon oxide ($SiO_2$) layer on the order of or less than 100A. A thin metal layer on the order of or less than 100A is deposited on the surface of the oxide layer. The metal layer is then completely covered by an insulating film such as a layer of the metal oxide or nitride (normally thicker than the $SiO_2$ film). The insulating film (e.g. metal oxide or nitride) may be formed, for example, by thermal reaction and diffusion or by a plasma- (rf or dc discharge) induced reaction. This film should have a smaller energy barrier and weaker high-field dependence for conduction than for $SiO_2$. Suitable metal contacts are deposited over the metal oxide or nitride layer for the gate electrode and over P+ diffused regions which define the source and drain electrodes as in the normal insulatedgate FET configuration.

The thin metal layer acts as a large trap, capable of storing an essentially unlimited charge, and has a capture probability close to unity. As a result, a very short width voltage pulse is all that is required to introduce charge (write-in) and a very short voltage pulse is all that is required to determine the amount of the charge which has been introduced (read-out). Effectively the time required for the read-in or read-out operation is limited only by the effective RC product of the circuit.

Other embodiments of this invention resembling the above-described single-crystal silicon FET may use polycrystalline deposited semiconductors. It is preferred that these devices work in the depletion mode, and thus appropriate metal contacts may be subsequently applied directly to the semiconductor film for the source and drain electrodes without the necessity of diffused P-N junctions at these regions. The semiconductor film may be either N or P type. A suitable metal film such as aluminum is deposited over the semiconductor film between those regions which will later define the areas for the source and drain electrodes. The metal film is then oxidized or nitrided to completion to form the first insulating film on the order of or less than 100A thick. Alternately, if the semiconductor is for example silicon, the first insulating film may be formed by direct oxidation of the silicon surface. The buried metal layer, the outer insulating film and the gate, source and drain electrodes are then deposited or formed as mentioned previously. The outer insulating film should be thicker and have a lower energy barrier and thus a weaker high field dependence for conduction than the inner insulating film adjacent to the semiconductor.

In still another embodiment of this invention, the device resembles a simple thin-film capacitor at low voltages. A deposited metal film is covered by an insulating film using an oxidation or nitriding process, for example. The thin metal layer, insulating film and outer metal electrode is then deposited and formed as in the devices described above. The two insulating films should have different barrier energies, and preferably the insulating film with a smaller energy barrier being thicker. Their relative position (upper or lower) in this case is not important. In this device, the charge is stored in the thin metal layer (write-in) as in the above devices by applying a voltage pulse of appropriate polarity and sufficient amplitude across the two electrodes. Read-out may be accomplished with somewhat smaller pulses of either polarity. The current which results depends on the charge stored in the thin metal layer.

DESCRIPTION OF THE PREFERRED EMBODIMENTS

Figure 1:
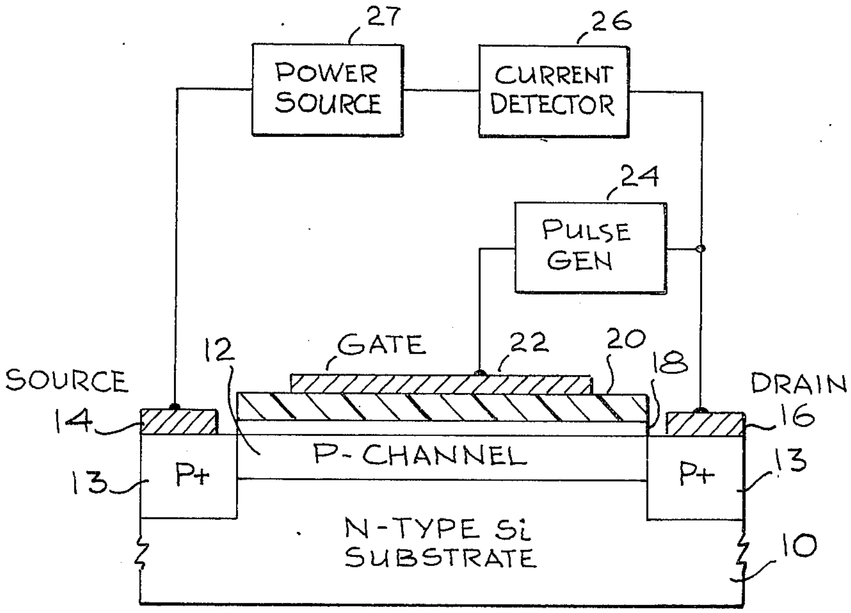
FIG. 1 is a schematic diagram of the presently known MNOS FET-type transistor.

FIG. 1 illustrates schematically the structure of the presently known MNOS FET transistor. There is a substrate 10, which is a semiconductor such as N-type silicon. On a surface of the N-type silicon the field effect results in an inversion layer of P-type silicon 12, which is designated as a Si P-channel. On opposite ends of the channel there is deposited over P+ diffused regions 13 a source electrode 14, and a drain electrode The next layer, which extends over the silicon P-channel between the source and drain P+ regions, is a thermally grown silicon dioxide ($SiO_2$) layer 18. On top of the oxide layer is deposited a silicon-nitride layer 20. On top of the silicon-nitride layer there is deposited another metal layer 22, which functions as a gate electrode.

In order to store a charge, a high voltage is applied across the layers. This is provided by the pulse generator 24, which is connected between the gate and drain electrodes. As a result, as previously stated, electrons are either captured or emitted at traps near the interface between the silicon-oxide and nitride films. Also, as previously indicated, in order to insure that the charge is stored in the deep traps and thus will be stored for a long period of time, it is necessary to apply a high-voltage across the insulating layers for a period on the order of a millisecond.

For readout purposes, a voltage pulse having an amplitude below the amplitude required for introducing charge into the semiconductor layers, is employed. This pulse is also applied between the gate and the drain electrodes. A current detector 26 and dc supply 27 is connected between the drain and the source electrodes. If charge was stored in the semiconductor device prior to the application of the field for read-out purposes, then a current is detected having a first amplitude. If no charge was stored or if the charge was introduced with a reverse polarity, then the level of the current detected is distinctly different than the level previously detected.

Figure 2:
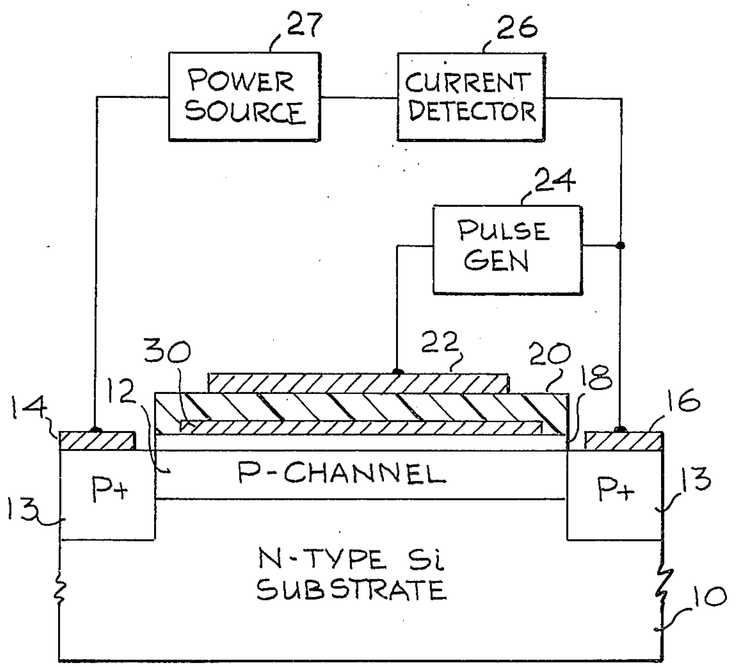
FIG. 2 is a schematic diagram of a construction of a transistor in accordance with this invention.
Figure 3:
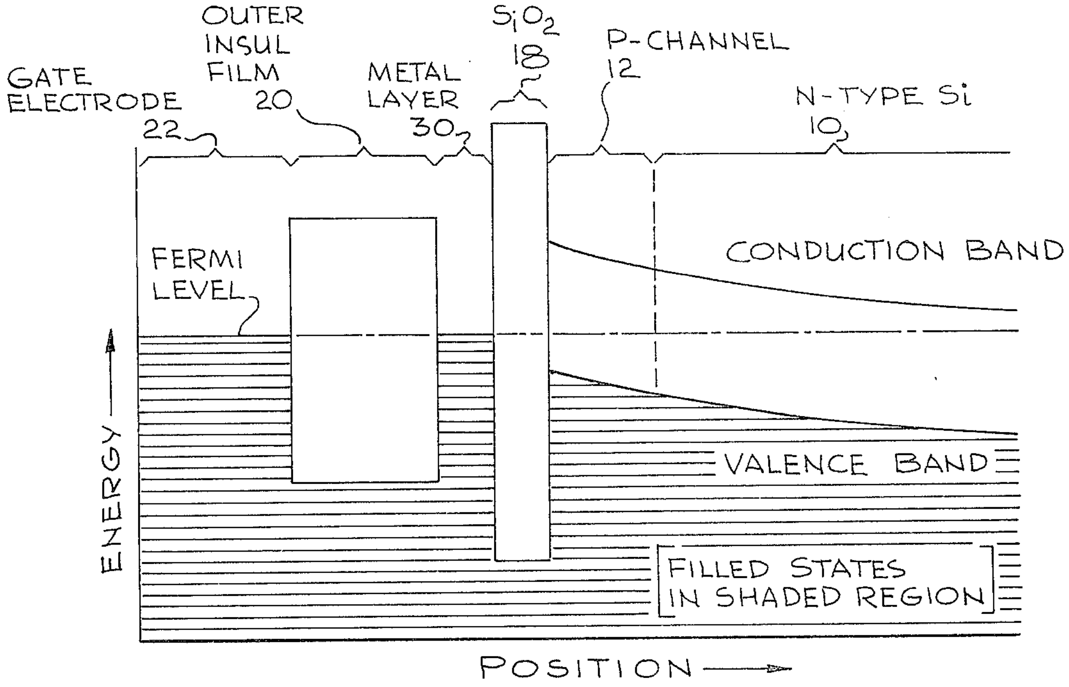
FIG. 3 is an energy diagram showing energy levels for the structure illustrated in FIG. 2.

The structure of the invention shown in FIG. 2 is similar to that shown in the prior art structure of FIG. 1 with two very important differences. One difference is in the use of a buried metal plate or layer 30, which is placed at the interface between the respective insulating layers 18 and 20. It was pointed out that a serious limitation on the structure of FIG. 1 occurs because of the finite time required to store charge in deep traps to assure long-time storage. The effect of the thin metal layer is to introduce a deep energy well which behaves as a large trap capable of storing an essentially unlimited charge and which has a capture probability close to unity. FIG. 3 shows an energy diagram for the structure represented in FIG. 2. Electrons are either added or removed from the metal layer 30 by applying a high-voltage pulse of appropriate polarity between the gate and drain electrodes. With negative pulses (gate electrode negative) electrons enter the structure and are trapped in the energy well at the buried plate location 30, (or alternately are emitted out of the well with positive pulses). Because of the presence of the two adjacent insulating films, electrons cannot readily leave or enter the well after the field is removed.

The other difference is the use of the metal layer 30 as a base metal for forming the outer insulator 20 by, for example, an oxidizing or nitriding process. The metal layer may be aluminum or any other metal that reacts to form a good insulating film.

If the films can be made sufficiently insulating, thicknesses on the order of, and even less than, 100 Angstroms can contain the charge, (excess or deficiency of electrons), with a decay constant on the order of years. On the other hand, the buried metal layer permits one to introduce charge using a high field in an extremely short time, limited only by the effective RC product of the circuit.

By way of illustration, and not to be construed as a limitation upon the invention, in constructing the device shown in FIG. 2, one starts by thermally oxidizing a silicon substrate by the usual methods to form a $SiO_2$ layer. Then, a thin metal layer such as aluminum, can be deposited on the $SiO_2$ layer. Then, a thin metal layer such as aluminum, can be deposited on the $SiO_2$ (but not large enough to cover the $SiO_2$ since the metal layer must be buried), and the metal layer can be oxidized or nitrided to form the outer insulator film.

It is essential to obtain an insulator film of high insulating quality for the desired results. As a means of eliminating any possibility of any conducting bridges through the outer insulator 20, leaking off any stored charge, it may be desirable to deposit the buried plate as a discontinuous layer, effectively comprising a plurality of laterally spaced and separately insulated areas of metal films. After oxidizing or nitriding, any defective areas would not affect the charge stored in adjacent film areas.

Figure 4:
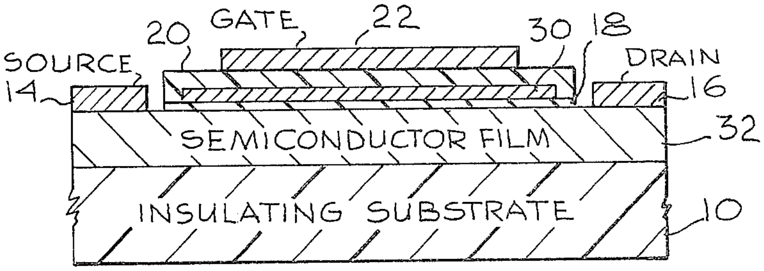
FIG. 4 is another schematic embodiment of the invention shown in cross section.

FIG. 4 illustrates a cross section of another suitable embodiment of the invention. The difference between the structure shown in FIG. 4 and that in FIG. 2 is in the use of a semiconductor film 32 which is deposited on an insulating substrate 10, and upon which the insulating layer 18 is formed. The semiconductor film may be polycrystalline where P+-N junctions would not be feasible. The device may be operated in the depletion mode requiring only that appropriate metal films be deposited on the semiconductor film for the source and drain electrodes. Other than that, the structure is the same as that shown and described in FIG. 2. This embodiment serves to depart from single-crystal technology for the purpose of large scale deposited arrays.

Figure 5:
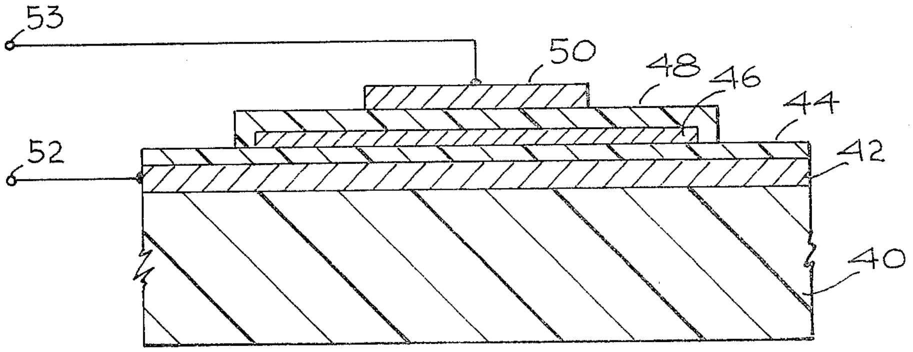
FIG. 5 is still another schematic embodiment of the invention shown in cross section.

FIG. 5 shows an embodiment of the invention which resembles a simple capacitor at low voltages. On the insulating substrate 40, there is deposited a metal film 42, which acts as one electrode and is connected to a terminal 52. On the metal film, designated as the bottom metal electrode 42, there is formed a first insulating film 44, which, for example, may be the metal oxide or nitride. On the surface of the insulating film there is deposited the metal layer 46.

The metal layer 46 is buried by a second insulating film 48, which may be formed by oxidizing or nitriding the metal layer 46. An outer metal electrode 50 is deposited on the second insulating film 48 and is connected to a terminal 53. The two insulating films 44 and 48 must not be identical but must exhibit different dependence of conductance on high fields. This condition can be accomplished with different insulating materials having different barrier energies. The insulating film with a smaller energy barrier would normally be made the thicker. The described structure may be used as a two-terminal memory element.

Figure 6:
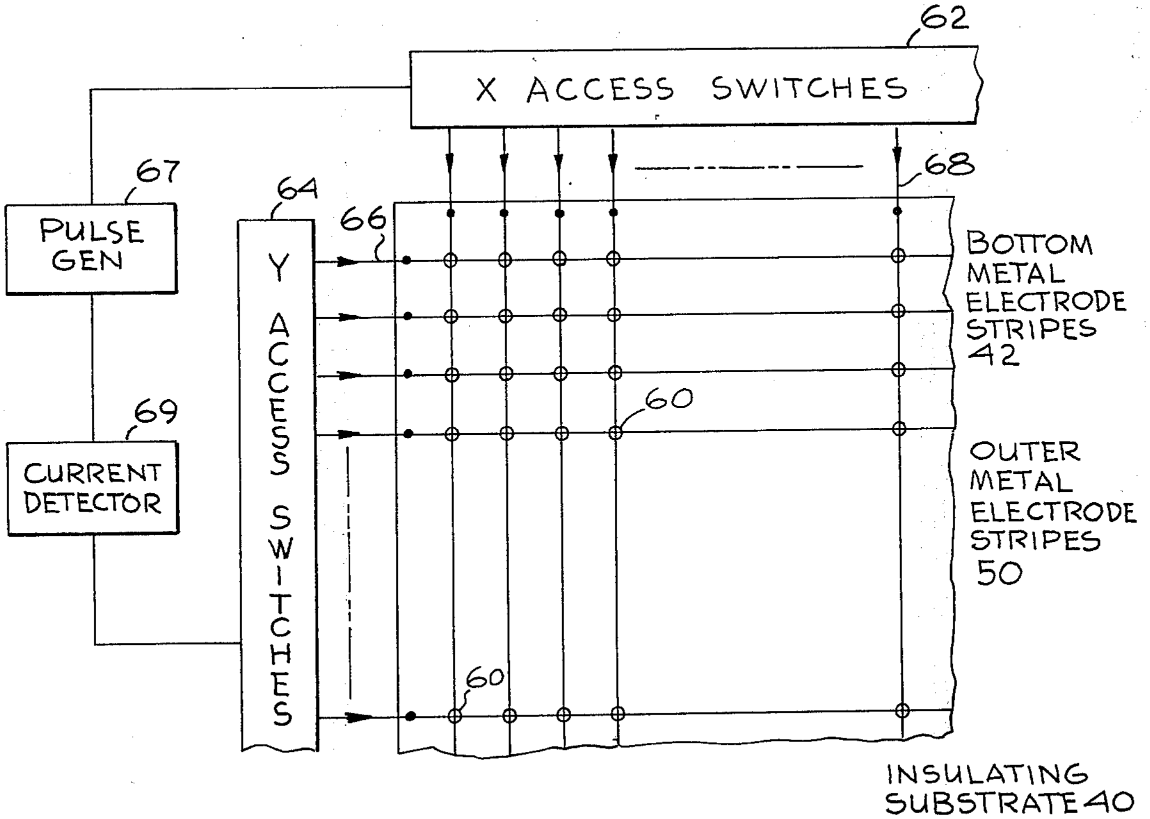
FIG. 6 shows a schematic arrangement for assembling the embodiment of FIG. 5 into a large-scale-memory array.

FIG. 6 illustrates an arrangement for a random access memory. Access to the array of storage devices, 60, which form the memory, is by using X access switches 62, and Y access switches 64. These may be used in well known fashion for the purpose of addressing one of the plurality of X wires 68 and one of the plurality of Y wires 66. The X wires extend vertically and the Y wires extend horizontally. At the intersection of each X and Y wire there is formed a memory device 60. It is selected for reading or writing by the application or suitable voltages to its intersecting X and Y wires.

Figure 7:
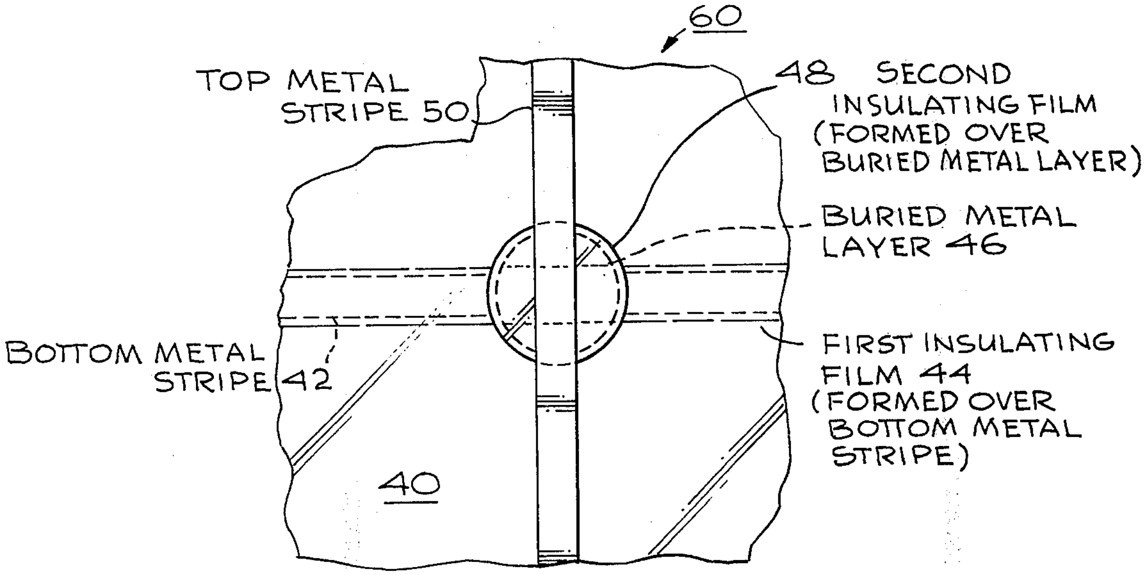
FIG. 7 schematically illustrates the plan view for one of the devices, which is used in the memory structure shown in FIG. 6.

The storage devices 60, may have the cross-sectional structure shown in FIG. 5, and the plan view shown in FIG. 7. The entire array of memory devices, including the axis wiring may be deposited on a single insulating substrate 40. The bottom metal electrode may consist of cross conducting strips 42. The first insulating film 44 may be formed, for example, by oxidizing or nitriding the bottom metal electrode along its entire length (contacts at the terminals to the access switches 66 may be made by penetrating through the first insulating film). A metal layer 46 (represented by the dotted circle) is then deposited over the insulating film 44. The second insulating film 48, is then formed over the metal layer (for example, by oxidizing or nitriding). The top electrode 50 is then deposited over the second insulating film 48. It extends as an X lead. The electrode 42 extends as a Y lead.

For write-in to the memory shown in FIG. 6, a voltage pulse is applied which exceeds a value whereby electrons may have their energy lifted sufficiently high to pass through the insulating film and, depending on the polarity, either enter or leave the energy well formed by the buried metal layer (see FIG. 3) thereby storing respectively either a net negative or positive charge. The voltage pulse is supplied by a pulse generator 67 between the X and Y access switches. If the applied voltage does not greatly exceed the required value, its application across leads X and Y can only affect the device defined by their intersection. Other devices in the array will see only a fraction of this voltage and will thus be unaffected. For a partially destructive read-out a voltage having either polarity may be applied with amplitudes somewhat less than the write-in pulses and the resulting current flow may be sensed with a current detector 69 in series with the pulse generator.

Figure 8:
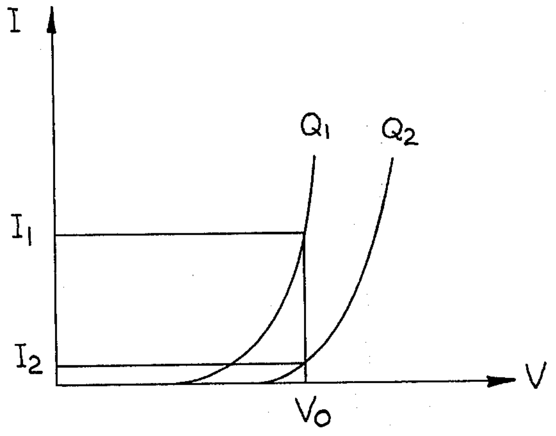
FIG. 8 is a graph illustrating read-out information from the memory as shown in FIG. 6.

The amplitude of the current flow, as shown in FIG. 8, will depend upon the polarity and amount of charge previously stored in the buried plate. Upon the application of voltage pulse $V_0$, if there is a large amount of positive charge $Q_1$ left stored in the memory device being interrogated, then a current value such as $I_1$ is obtained. If the amount of charge stored is small or negative, such as $Q_2$, then a current value $I_2$ will be read in the output. This read-out procedure is only partially destructive because of the smaller pulses used during interrogation which cause only slight changes in the stored charge. Thus, if only a limited number of interrogations are required, it will not be necessary to rewrite and the process becomes equivalent to a non-destructive one. Furthermore, the influence of read-out on the stored charge could be greatly reduced by alternating the polarity between successive read-out pulses.

A completely non-destructive read-out may be accomplished with a scanning optical or electron beam. The optical effect would depend on internal photo-emission over the barrier height provided by the insulating films. The effective barrier height and thus the amplitude of the photo-emission read-out currents would depend upon the stored charge. The electron beam would sense the surface potential resulting from the stored charge and could be detected as in a conventional scanning electron microscope.

Figure 9:
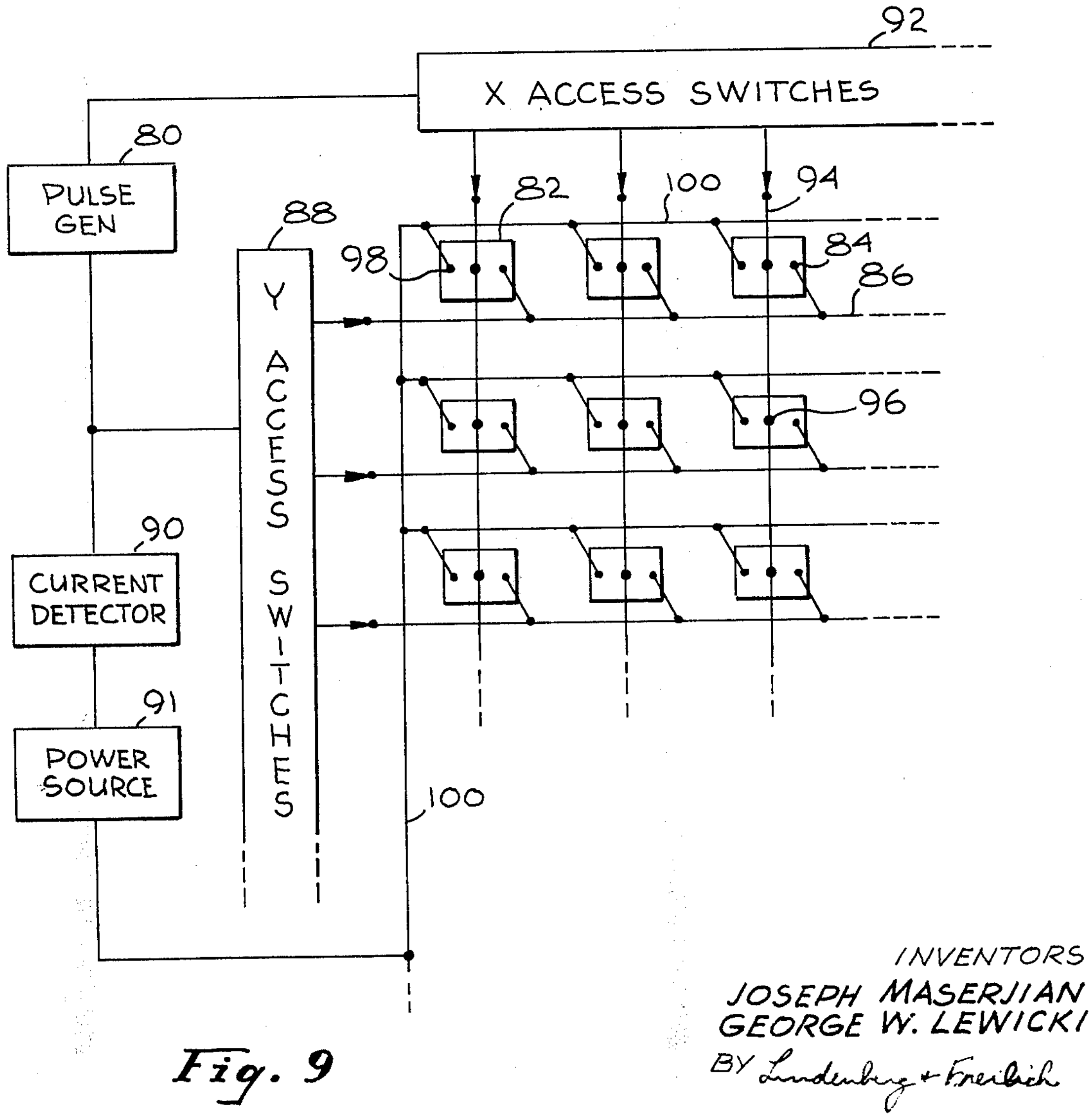
FIG. 9 shows a schematic arrangement for assembling another embodiment of the invention into a large-scale-memory arrangement.

FIG. 9 illustrates a schematic diagram of a memory which employs devices of the type shown in FIG. 2 or 4. Each one of these devices 82 has a drain electrode 84 connected to a Y line 86, which is connected to a Y access switch 88. X access switches 92, are connected to X lines 94, which are connected to the gate terminals 96 on each one of the devices 82. Each one of the sources electrodes 98, connects to a common lead 100. The pulse generator 80 is connected between the inputs to the X and Y access switches, 92 and 88. The current detector 90 and dc power source 91 are connected in series between the input to the Y access switch 88 and the common lead 100.

Negligible current flows between the source and drain unless the threshold voltage between the gate and drain electrode is exceeded. For read-out, excitation is applied between the gate and drain electrodes in the form of a voltage pulse having a predetermined polarity and amplitude. A current increase will result if the voltage pulse exceeds the threshold voltage which is determined by the charge stored prior to read-out. For read-in, voltage pulses are also applied between the gate and drain electrodes, but with larger amplitudes of appropriate polarity to store charges as described earlier.

The structure described thus far, which can be referred to as a MIMIM device, effectively can be analogized to the structure of two capacitors connected in series, wherein both capacitors have the same area. Thus, when a voltage is applied across the MIMIM device, in view of the construction shown thus far, the electric field is applied equally to the insulating layers on either side of the buried plate if they are of the same material. If different insulating materials are used, the electric field intensity which is applied is inversely proportional to the dielectric constants of the two insulating layers. The maximum voltage that can be applied and the maximum charge which can be stored is determined by the difference in conduction through the two insulating layers and the ability of the weakest of the two insulating layers to withstand the electric field applied thereacross. It is preferred to have conduction occur through one insulating material layer and not the other to get maximum net charge into and out of the buried metal plate. To increase the speed of operation, a high charging and discharging current is desirable. This however requires the use of high electric fields. Increasing dielectric thickness of one layer or using different dielectric constant materials, it has been found, does not alter matters much since they require similar electric displacements (electric field times dielectric constant) to be applied at which conduction will commence. An alternative solution is desirable, and this is presented by the present invention.

Figure 10:
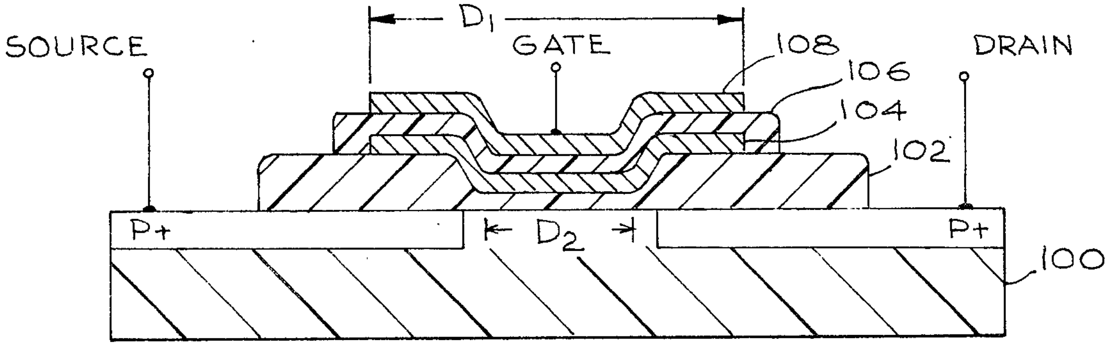
FIG. 10 is a cross section of an embodiment of the invention illustrating different capacitive regions.

FIG. 10 is a cross-sectional view of an embodiment of this invention whereby the amount of charge which can be stored is not limited by differences in the dielectric constant and the dependence of conduction of electric field between the two dielectric layers. This is achieved by varying the ratio of the dielectric areas provided by the MIMIM device whereby the voltage applied thereacross divides inversely with the areas. Thereby the insulating layer, which has the lower ability to withstand the stress of an electric field, has a larger dielectric area; and the other insulating layer, which can better withstand the high field required for conduction, has a smaller dielectric area. Thereby the electric field intensity to which the lower stressresistant insulating layer is subjected is within its capabilities. The higher electric field stress-resistant dielectric layer has a greater or more intense electric field thereacross and thus is forced to conduct without an undue increase in the voltage applied across the two layers. As a result, readout sensitivity is increased, due to the larger charge which is stored. Similarly, the time required for storage is reduced because of the more efficient charging current through one layer.

As shown in FIG. 10, the construction, in accordance with this invention, includes a silicon substrate 100 having a silicon dioxide layer 102 grown thereon. This layer is substantially thicker at its periphery than it is in the central region. The area of the central region has a diameter designated as D2. This area determines the area of the dielectric of the smaller capacitor of the two which are being constructed, and consequently the capacitor across which a higher electric field will be developed.

A buried metal layer 104 is deposited over the insulating layer 102. A layer of insulation 106 buries the metal layer 104. The layer of insulation 106 is the one whose ability to withstand the stress of the electric field may be lower than the layer 102, although this is not required. A layer of metal 108 is deposited over the insulating layer 106. The area of the capacitor, which involves the insulating layer 106, is determined by the diameter D1 of the metal layer 108.

The operation of the device shown in FIG. 10 is the same as for the invention described in FIG. 2.

Figure 11:
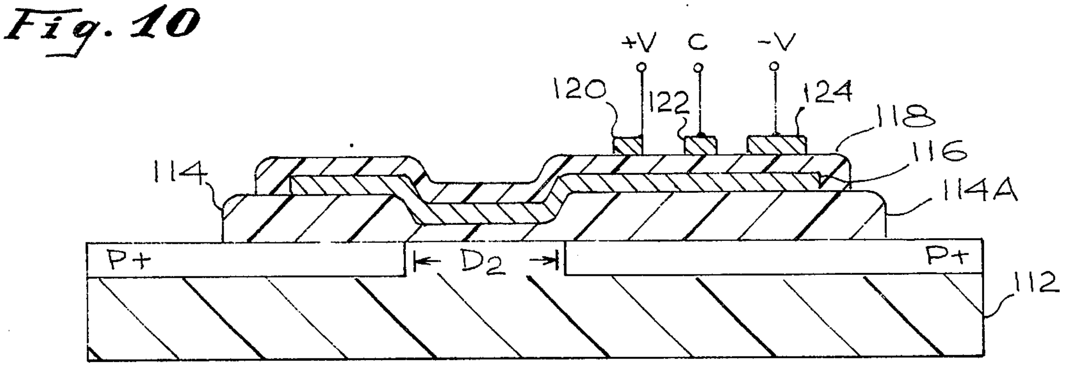
FIG. 11 is a cross section of another embodiment illustrating different capacitive regions.

FIG. 11 is another embodiment of the invention utilizing the principle of changing the areas of the capacitors established by this device in order to achieve an improved operation. The silicon substrate 112 has grown thereon, a silicon dioxide layer 114, as before, with the outer periphery very much thicker than the central region which has a diameter D2. However, this insulating layer 114 is extended to have an extra length 114A, at one side, as shown in the drawing.

A buried metal layer 116 is deposited over the silicon dioxide insulating layer 114, and extends over the region 114A of the insulating layer 114. An insulating layer 118, which buries the metal layer 116, is deposited thereover and is substantially coextensive with the insulating layer 114. Three metal electrodes 120, 122 and 124 are deposited over the enlarged side of the insulating layer 118. Here, the capacitive areas are determined by the electrodes 120, 122 and 124. In order to apply charge to the device to one polarity (or state), a voltage +V is applied between the electrode 120 and 122. The small capacitance established by the small area electrode 120 enables a high current flow through that capacitor alone and therefore quickly dumps charge into the device. For erasure or in order to charge the device to the opposite polarity, a negative voltage is applied between the electrode 124 and the electrode 122. In this case, the smaller capacitance established by electrode 122 enables current to flow through that capacitor alone and therefore dumps an opposite charge into the device.

Two electrodes may be used if desired instead of three but this would require polarity switching for the storage operations. With the configuration shown, all electrodes are on one side, which is advantageous in making connections thereto, and there is no polarity switching required. Also, it is often desirable to have current flow in one direction only through a dielectric. Using three electrodes and the voltage polarities shown, this is accomplished for both polarity storage operations.

Figure 12:
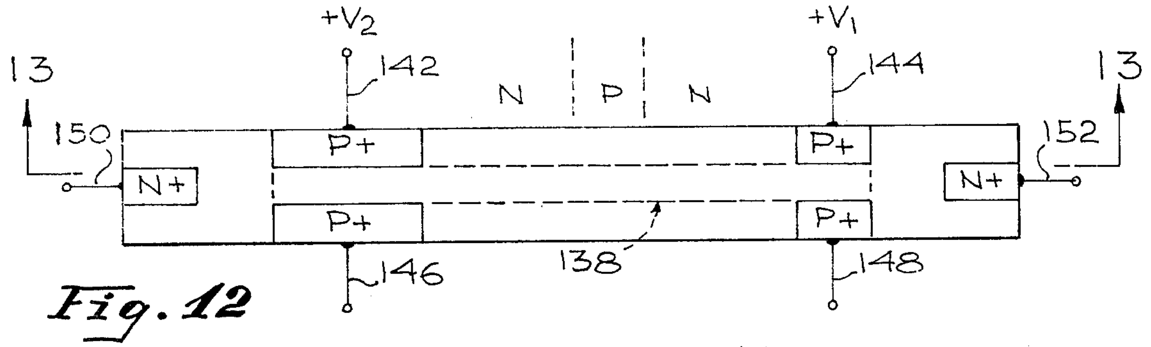
FIG. 12 is a view in elevation of still another embodiment of the invention illustrating different capacitive regions.
Figure 13:
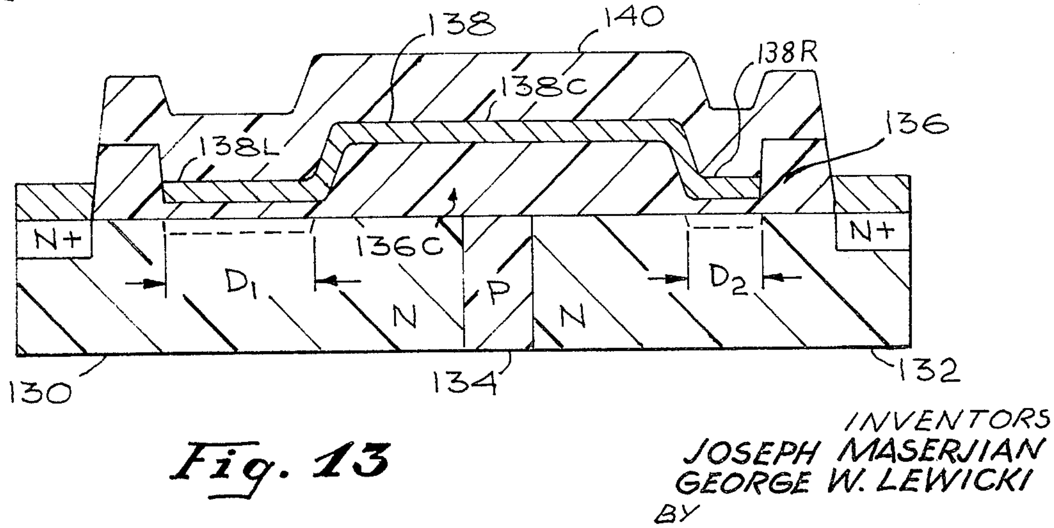
FIG. 13 is a cross sectional view along the lines 13—13 of FIG. 12.

FIG. 12 is a view in elevation of another embodiment of the invention, and FIG. 13 is a cross-sectional view along the lines 13—13 of FIG. 12. Here the silicon substrate is divided into two parts 130, 132 by means of junctions formed by P-layer 134. These junctions are an isolation mechanism which can also be established by using silicon or sapphire, dielectric isolation, or any other isolation technique. A first silicon dioxide layer 136 is grown on the silicon substrate. It has two thin regions on either side.

A buried conducting plate 138 is deposited on the layer 136. Its center region 138C covers the thick center region 136C of the layer 136, but over the thin region on one side 138L has a larger area than over the thin region on the other side 138R. A second silicon dioxide layer 140 is deposited over the plate 138 over the portions of the layer 136 which extend from under it to thereby bury the plate. Two different area capacitors, as shown by their width D1 and D2, are formed by this construction.

Source and drain regions are formed by suitable doping of the silicon under each side 138L and 138R of the buried metal plate. Connecting terminals in well-known fashion form therewith source electrodes 142, 144 and drain electrode 146, 148. Also at each end of the silicon substrate an N+ dopant is applied to establish silicon contacts 150, 152 which are common to many possible devices on each side of the isolation layer 134.

The left and right halves of the structure shown in FIGS. 12 and 13 form two FET's and either or both may be used in large arrays for readout or for specific logic circuits. The application of a $+V_1$ pulse to terminal 144 with contact 150 common charges the buried gate 138 (through the smaller area MOS). The application of a $+V_2$ pulse to terminal 142 with contact 152 common charges the buried gate negatively (through the smaller area MOS).

There has accordingly been described and shown herein a novel improvement in a charged-storage device whereby the maximum charge stored can be increased, the time required for introducing charge shortened, and the voltage pulse reduced to the extent that these devices are feasible for use for non-volatile memory purposes for high-speed computers. New charge-storage devices have also been described that can be deposited into high-density memory arrays.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A charge-storage device comprising a substrate having a first continuous insulating layer deposited or grown thereon, said first insulating layer having one area thereof which is thinner than the remainder of the area of said first insulating layer, a conducting layer deposited over both thin and thick areas of said first insulating layer, a second insulating layer deposited over and completely covering said conducting layer, and electrode means coupled to said storage charge device for applying charge thereto and for deriving charge therefrom, said electrode means constituting a plurality of spaced metallic depositions on said second insulating layer which is over a portion of said conducting layer, the area of each metallic deposition having a different size than the area of the others for establishing different capacitances.

2. A charge-storage device comprising a substrate having a first continuous insulating layer deposited or grown thereon, said first insulating layer having one area thereof which is thinner than the remainder of the area of said first insulating layer, a conducting layer deposited over both thin and thick areas of said first insulating layer, a second insulating layer deposited over and completely covering said conducting layer, and electrode means including first, second and third spaced metallic depositions on said second insulating layer for applying charge thereto and for deriving charge therefrom, said second metallic deposition having a larger area than said first metallic deposition, and said third metallic deposition having a larger area than said second metallic deposition.

3. A charge-storage device as recited in claim 2 wherein said first, second and third spaced metallic depositions are all positioned over a thicker region of said first insulating layer.

4. A charge-storage device as recited in claim 2 wherein there is included means for applying a potential between said first and second metallic depositions with a polarity for charging said charged storage device, and means for applying a voltage between said second and third metallic depositions with a polarity for discharging said storage device.

* * * * *